United States Patent
Yamamoto et al.

(10) Patent No.: US 6,903,518 B2
(45) Date of Patent: Jun. 7, 2005

(54) DISCHARGE LAMP DEVICE AND BACKLIGHT USING THE SAME

(75) Inventors: Norikazu Yamamoto, Yawata (JP); Teruaki Shigeta, Neyagawa (JP); Nobuhiro Shimizu, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 126 days.

(21) Appl. No.: 10/446,848

(22) Filed: May 29, 2003

(65) Prior Publication Data

US 2003/0222601 A1 Dec. 4, 2003

(30) Foreign Application Priority Data

May 31, 2002 (JP) ........................................ 2002-159081

(51) Int. Cl.[7] .................................................. G05F 1/00
(52) U.S. Cl. ........................ 315/291; 315/246; 315/335; 313/595; 313/607
(58) Field of Search ........................ 315/291, 246, 315/335, 358; 313/595, 596, 600, 607, 641

(56) References Cited

U.S. PATENT DOCUMENTS

| | | | | |
|---|---|---|---|---|
| 4,871,941 A | * | 10/1989 | Dobashi et al. ............ | 313/485 |
| 4,882,520 A | * | 11/1989 | Tsunekawa et al. ......... | 313/643 |
| 4,899,090 A | * | 2/1990 | Yoshiike et al. ............ | 315/335 |
| 5,514,934 A | * | 5/1996 | Matsumoto et al. ........ | 313/607 |
| 5,666,031 A | * | 9/1997 | Jennato et al. ............. | 315/246 |
| 6,099,134 A | * | 8/2000 | Taniguchi et al. ........... | 362/31 |
| 6,614,185 B1 | * | 9/2003 | Nishimura et al. ......... | 313/607 |
| 2002/0021564 A1 | | 2/2002 | Cho et al. | |

FOREIGN PATENT DOCUMENTS

| | | |
|---|---|---|
| DE | 36 17 110 | 11/1987 |
| JP | 6-163005 | 6/1994 |
| JP | 11-297278 | 10/1999 |
| JP | 2000-40494 | 2/2000 |
| JP | 2000-106146 | 4/2000 |
| JP | 2001-006622 | 1/2001 |
| JP | 2001-267093 | 9/2001 |
| JP | 2001-313002 | 11/2001 |
| JP | 2002-75682 | 3/2002 |
| JP | 2003-347081 | 12/2003 |
| WO | 01/79922 | 10/2001 |

\* cited by examiner

Primary Examiner—Haissa Philogene
(74) Attorney, Agent, or Firm—Wenderoth, Lind & Ponack, L.L.P.

(57) ABSTRACT

A discharge lamp device which drives a discharge tube filled with a rare gas and has a first electrode mounted at the inside of the tube and a second electrode mounted at the outside of the tube. The lamp device includes a driving circuit that applies a voltage between the first and second electrodes. The driving circuit applies a positive rectangular wave voltage to the first electrode with a potential of the second electrode being a reference potential (0V) A backlight includes at least one discharge tube and the discharge lamp device.

20 Claims, 15 Drawing Sheets

DISCHARGE LAMP DEVICE AND BACKLIGHT USING THE SAME

BACKGROUND OF THE INVENTION

1. Field of the Invention

The present invention relates to a discharge lamp device that lights a discharge tube, and more particularly to a discharge lamp device that lights a discharge tube filled with a rare gas and provided with a first electrode at the inside thereof and a second electrode at the outside thereof. The present invention relates further to a backlight provided with such a discharge lamp-device.

2. Description of the Related Arts

There has been proposed, for example, a rare gas discharge lamp device disclosed in Japanese Laid-Open Patent publication No. 6-163005, as a discharge lamp device that applies a voltage to a discharge tube filled with a rare gas and having an internal electrode mounted at its inside and an external electrode mounted at its outer peripheral surface from a driving circuit connected to the internal electrode and the external electrode for driving the discharge tube.

Regarding lighting control to the discharge tube which has the internal and external electrodes, there are documents such as Japanese Laid Open publication Nos. 2002-75682 and 2001-267093, in which an alternating rectangular wave voltage is applied as a driving voltage.

FIG. 14 is a view showing a configuration of a conventional discharge lamp device. In this figure, a discharge lamp device 10L has a cylindrical discharge tube 103 filled with a rare gas. The discharge tube 103 has an internal electrode 101 mounted at the inside of the discharge tube 103, and a band-shaped external electrode 102 mounted along the tube axis direction of the discharge tube 103 at its outer peripheral surface.

The internal and external electrodes 101 and 102 are respectively connected to a driving circuit 105 which causes the discharge tube 103 to emit by applying an alternating rectangular wave voltage.

FIGS. 15A to 15C are waveform charts showing waveforms of an applied voltage or the like in the conventional discharge lamp device. FIG. 15A shows a waveform of an alternating rectangular-wave voltage applied between the internal and external electrodes 101 and 102, in which the axis of ordinate represents an applied voltage (V) between the internal and external electrodes 101 and 102 when the potential of the external electrode 102 is defined as a reference potential, while the axis of abscissa represents a time (s), respectively.

FIG. 15B shows a waveform of electric current flowing through the internal and external electrodes 101 and 102, in which the axis of ordinate represents current (A), while the axis of abscissa represents a time (s), respectively. Further, FIG. 15C shows a waveform of a brightness, in which the axis of ordinate represents a brightness (cd/m$^2$), while the axis of abscissa represents a time (s), respectively.

In case where the alternating rectangular-wave voltage that alternately becomes a positive voltage and a negative voltage is applied as shown in FIG. 15A, positive current (current at the rising edge) having a differential wave shape corresponding to a rising edge of the positive voltage and negative current (current at the falling edge) having the differential wave shape corresponding to a falling edge of the negative voltage are alternately flown as shown in FIG. 15B.

A phosphor in the discharge tube 103 is excited when the positive current or negative current flows therethrough, to thereby provide a brightness characteristic shown in FIG. 15C. Specifically, the brightness is shown as a waveform L1 corresponding to the positive current and a waveform L2 with a brightness smaller than that of the brightness waveform L1 corresponding to the negative current.

As shown in FIG. 15C, the brightness characteristic (brightness waveform L2) upon applying the negative voltage has a brightness lower than that of the brightness characteristic (brightness waveform L1) upon applying the positive voltage by a level shown by a reduced-brightness waveform L4, thus to reduce a luminous efficiency. This is considered that a contraction discharge occurs upon applying the negative voltage, causing a brightness reducing action due to this contraction discharge, thus to lower the brightness.

Hence, the conventional method for applying an alternating rectangular-wave voltage brings a reduction in brightness every half cycle of the alternating rectangular-wave voltage, so that a sufficient luminous efficiency cannot be obtained.

SUMMARY OF THE INVENTION

The present invention is accomplished in view of the above-mentioned subject, and aims to provide a discharge lamp device having improved brightness and luminous efficiency, and a backlight suitable for a liquid crystal display device or the like.

In the first aspect of the invention, provided is a discharge lamp device which drives a discharge tube filled with a rare gas and has a first electrode mounted at the inside thereof and a second electrode mounted at the outside thereof. The device includes a driving circuit that applies a voltage between the first and second electrodes. The driving circuit applies a positive rectangular wave voltage to the first electrode with a potential of the second electrode being a reference potential.

In the second aspect of the invention, provided is a discharge lamp device which drives a discharge tube filled with a rare gas and has a first electrode mounted at the inside thereof. The discharge lamp device includes a support plate having a plurality of second electrodes arranged in parallel and supporting the discharge tube in proximity to the discharge tube, and a driving circuit that applies a voltage between the first and second electrodes. The driving circuit applies a positive rectangular-wave voltage to the first electrode with a potential of the second electrode being a reference potential.

In the third aspect of the invention, a backlight including at least one discharge tube and the above-mentioned discharge lamp device is provided.

DESCRIPTION OF THE PREFERRED EMBODIMENTS

Embodiments of a discharge lamp device and a backlight according to the present invention will be explained hereinbelow in detail with reference to the appended drawings.

First Embodiment

Figure 1:
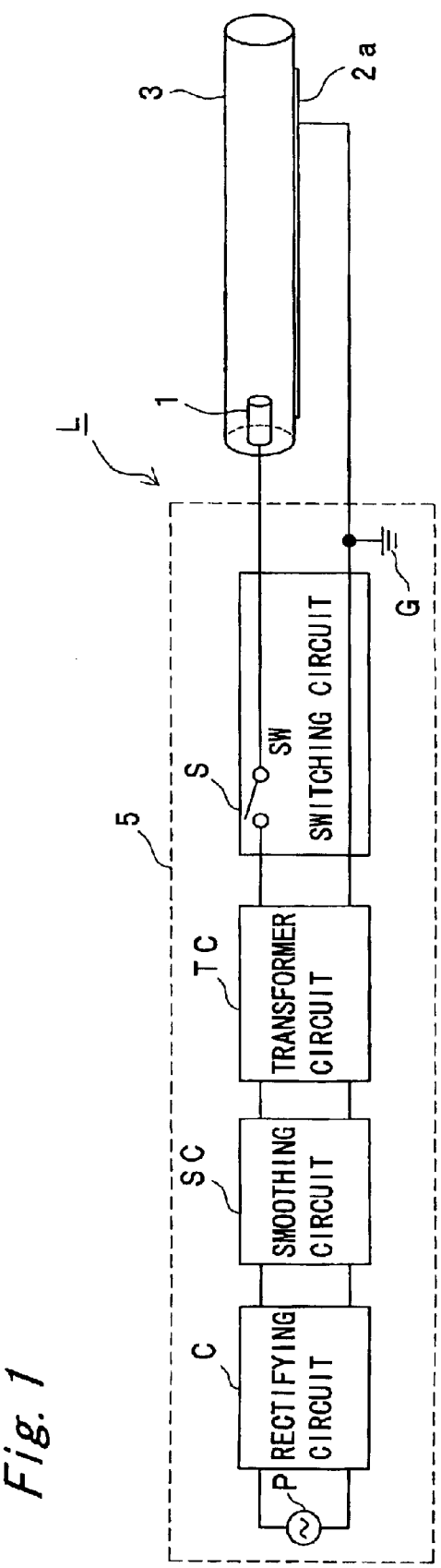
FIG. 1 is a block diagram showing one example of a schematic configuration of a discharge lamp device in the first embodiment of the present invention.

FIG. 1 is a block diagram showing a schematic configuration of a discharge lamp device according to the present invention. A discharge lamp device L is provided with a discharge tube 3 and a driving circuit 5 that applies a driving voltage to the discharge tube 3 for lighting the same.

The discharge tube 3 is filled therein with a rare gas (inactive gas) such as xenon, krypton or the like, and has a phosphor such as $LaPO_4$:Ce, Tb or the like applied on its inner wall. An internal electrode 1 made of nickel or the like is mounted at the inside of one end of the discharge tube 3. A band shaped external electrode 2a is mounted along the tube axis direction of the discharge tube 3 on its outer peripheral surface. The external electrode 2a is formed by fixing an aluminum tape or a conductive wire onto the surface of the discharge tube 3, or applying a conductive material such as a silver paste or the like on the surface of the discharge tube 3. The application of a voltage between the internal and external electrodes 1 and 2a of the discharge tube 3 produces an internal glow discharge thus to bring the rare gas filled therein into an excitation state. Ultraviolet rays emitted upon bringing the rare gas from the excitation state to a normal state excites the phosphor in the discharge tube 3, thereby emitting visible light.

The discharge tube 3 has a cylindrical shape, and preferably has an inner diameter of not less than 1 mm nor more than 10 mm, a thickness of not less than 0.2 mm nor more than 0.5 mm and a tube length of not less than 100 mm nor more than 300 mm. This is because a small-sized backlight can be realized assuring a necessary brightness and luminous efficiency without having a shape that is larger than necessary, in a case where the discharge lamp device according to the present invention is used as a backlight. Another reason is that, when it is applied to a backlight for a liquid crystal display device, a backlight having a shape matched to the shape of the small-sized liquid crystal display device can be configured. A driving circuit 5 is connected to the internal electrode 1 and the external electrode 2a of the discharge tube 3.

The driving circuit 5 includes a rectifying circuit C that rectifies AC voltage supplied from an AC power source P, a smoothing circuit SC that smoothes the positive voltage after the rectification to thereby obtain DC voltage of the positive voltage, a transformer circuit TC that steps-up the DC voltage obtained from the smoothing circuit SC to a voltage required for emitting the discharge tube 3 and a switching circuit S that produces a rectangular voltage from the DC voltage stepped-up by the transformer circuit TC. The switching circuit S controls on/off of a switch SW. The on/off of the switch SW produces the rectangular voltage from the stepped-up DC voltage.

Subsequently explained is a control in the driving circuit 5 of the applied voltage (driving voltage) to the discharge tube 3.

Figure 2A:
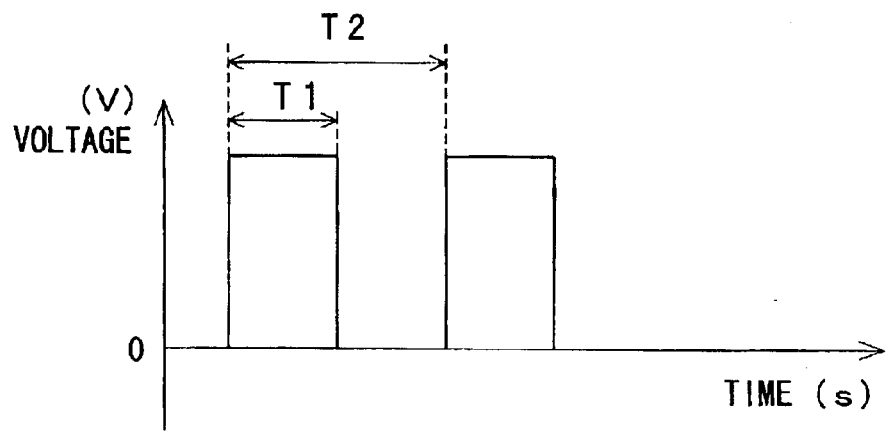
FIG. 2A is a view showing a waveform of an applied voltage in the discharge lamp device of the present invention.
Figure 2B:
FIG. 2B is a view showing a waveform of current in the discharge lamp device of the present invention.
Figure 2C:
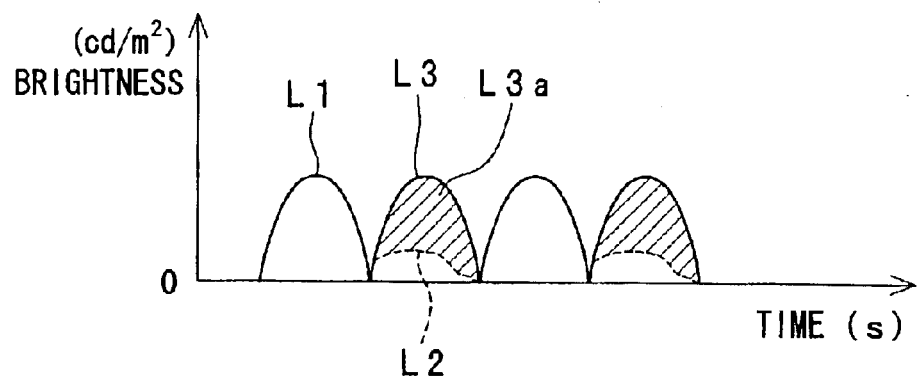
FIG. 2C is a view showing a waveform of a brightness of a discharge tube in the discharge lamp device of the present invention.

FIGS. 2A to 2C shows waveforms of the applied voltage to the discharge tube 3 by the discharge lamp device L, or the like. FIG. 2A is a voltage waveform chart showing a waveform of the voltage applied between the internal electrode 1 and the external electrode 2a of the discharge tube 3, in which the axis of ordinate represents a rectangular-wave voltage (V) and the axis of abscissa represents a time (s), respectively. It should be noted here that a period for applying the positive voltage is referred to as T1 while a period for applying the rectangular-wave voltage as T2. FIG. 2B is a waveform chart of current flowing between the internal electrode 1 and the external electrode 2a, in which the axis of ordinate represents current (A) and the axis of abscissa represents a time (s), respectively. Further, FIG. 2C is a waveform chart of a brightness of the discharge tube 3, in which the axis of ordinate represents a brightness (cd/m$^2$) and the axis of abscissa represents a time (s), respectively.

As shown in FIG. 2A, the potential of the external electrode 2a is fixed to a reference potential (i.e., 0 V) with respect to the discharge tube 3 and a rectangular-wave voltage comprising only a positive voltage is applied to the internal electrode 1 in the present invention. A ground potential is preferable for the reference potential, so that the external electrode 2a is connected to a ground point G that gives a ground potential.

According to the voltage application shown in FIG. 2A, positive current (current at the rising edge) having a differential wave shape corresponding to a rising edge of the positive applied voltage and negative current (current at the falling edge) having the differential wave shape corresponding to a falling edge of the negative applied voltage are alternately flown as shown in FIG. 2B.

A phosphor in the discharge tube 3 is excited when the positive current or negative current flows therethrough, to thereby obtain a brightness characteristic shown in FIG. 2C. Specifically, brightness is obtained as shown by a brightness waveform L1 corresponding to the positive current and a brightness waveform L3 corresponding to the negative current. The brightness waveform L3 during the period when the applied voltage is 0 V has a size approximately equal to that of the brightness waveform L1. This means the brightness is increased in the range shown by L3a with respect to the conventional brightness waveform L2. The luminous efficiency is enhanced with the increase in the brightness.

Figure 3A:
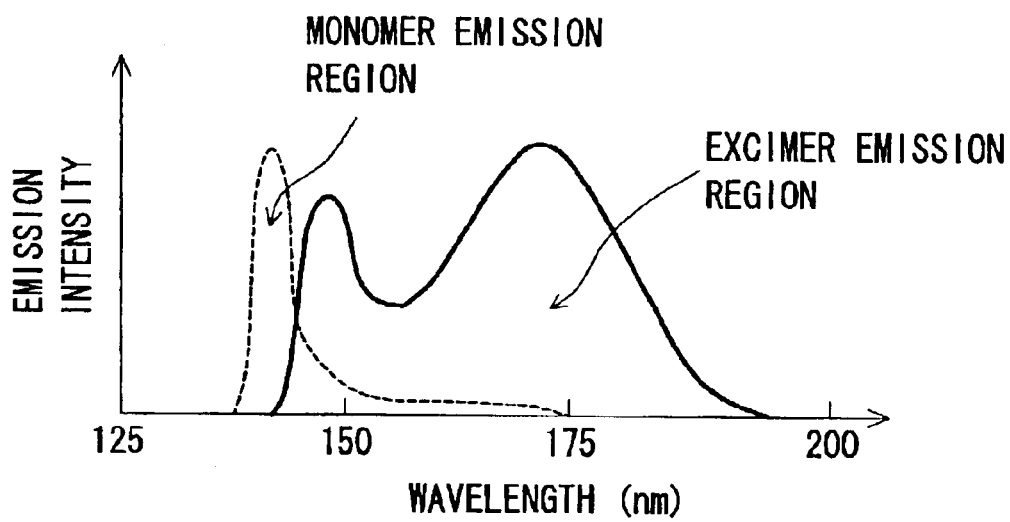
FIG. 3A is a view showing an emission spectrum of rare gas (Xenon gas).
Figure 3B:
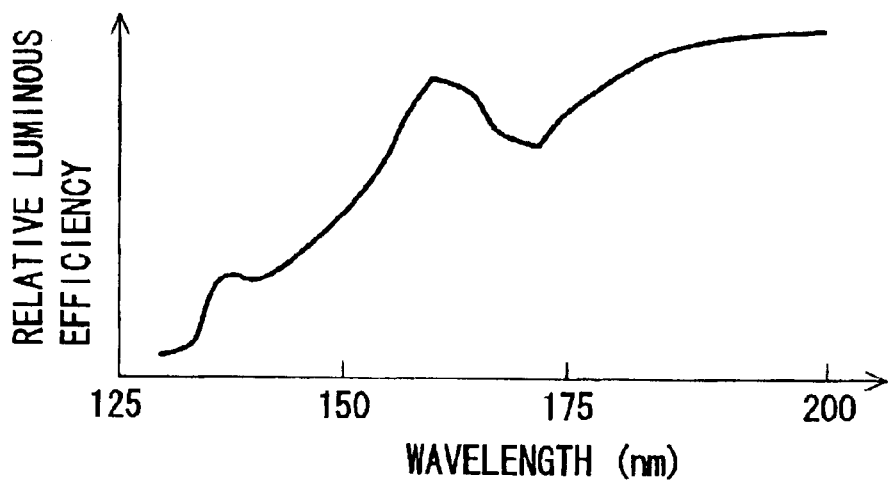
FIG. 3B is a view showing an excitation spectrum of a phosphor.

FIG. 3A is a view showing an emission spectrum of Xenon gas that is one of discharge gas filled in the discharge tube 3, while FIG. 3B is a view showing an excitation spectrum of LaPO$_4$:Ce, Tb that is one of phosphors used for the discharge tube 3. As shown in FIG. 3A, the emission spectrum includes a monomer emission region centered around 147 nm and an excimer emission region centered around 172 nm. The brightness characteristic of the discharge tube 3 is determined by the multiplier effect of the spectrum characteristic shown in FIG. 3A and the characteristic of the excitation spectrum of the phosphor shown in FIG. 3B.

As described above, the method for driving the applied voltage in this embodiment can prevent the reduction in the brightness occurring every half cycle in the conventional method for applying the alternating rectangular-wave voltage, thereby enhancing the brightness and luminous efficiency. The reason why the brightness is improved during the period for which the driving voltage is not applied as shown in FIG. 2C is unclear due to the complicated discharge phenomenon. It can be considered for the reason, for example, that the contraction discharge is decreased, that the synergistic effect in the discharge phenomenon as joint result of the monomer emission during the period for which the positive rectangular-wave voltage is applied and the excimer emission during the period for which the voltage is not applied is effectively acted on the phosphor, and that the internal electrode acts only as an anode and not as a cathode that does not produce the rare gas excitation.

Moreover, the brightness and luminous efficiency can remarkably be enhanced by suitably controlling on-duty (T1/T2) of the rectangular-wave consisting of the positive voltage pulse that is to be applied to the internal electrode 1, as described in detail in the fourth embodiment. This is because the change in on-duty varies the spectrum in the excimer emission region, thereby the brightness can further be enhanced by the synergistic effect between the emission spectrum of the discharge gas and the excitation spectrum of the phosphor. For example, it is desirable to control the on/off operation of the switch SW of the switching circuit S in PWM control with the on-duty that is not less than 10% nor more than 50% for attaining its carrier frequency of not less than 10 kHz nor more than 60 kHz. It should be noted that the range of the frequency is selected based upon the facility of the occurrence of the luminous phenomenon.

Figure 4A:
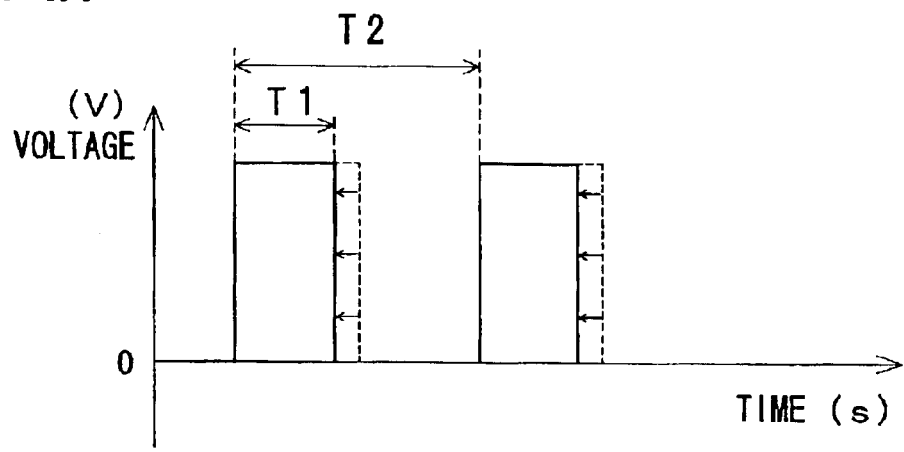
FIG. 4A is a view showing a waveform of an applied voltage in the case of suitably controlling a duty ratio (on-duty) in the discharge lamp device of the present invention.
Figure 4B:
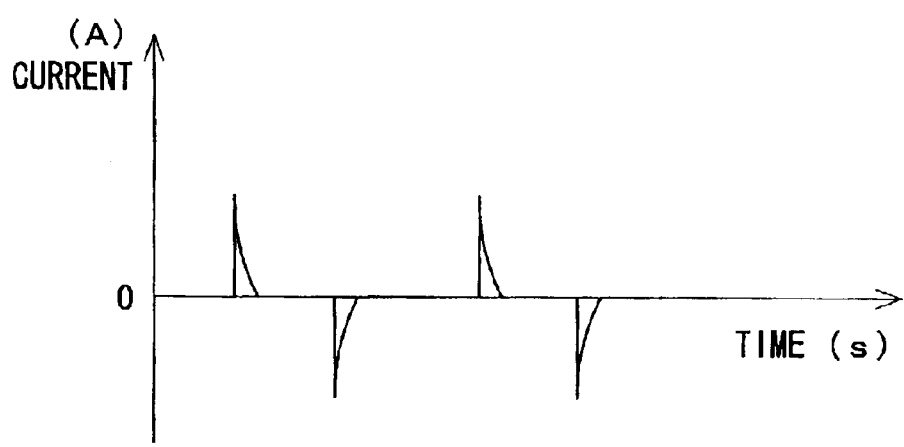
FIG. 4B is a view showing a waveform of current in the case of suitably controlling a duty ratio (on-duty) in the discharge lamp device of the present invention.
Figure 4C:
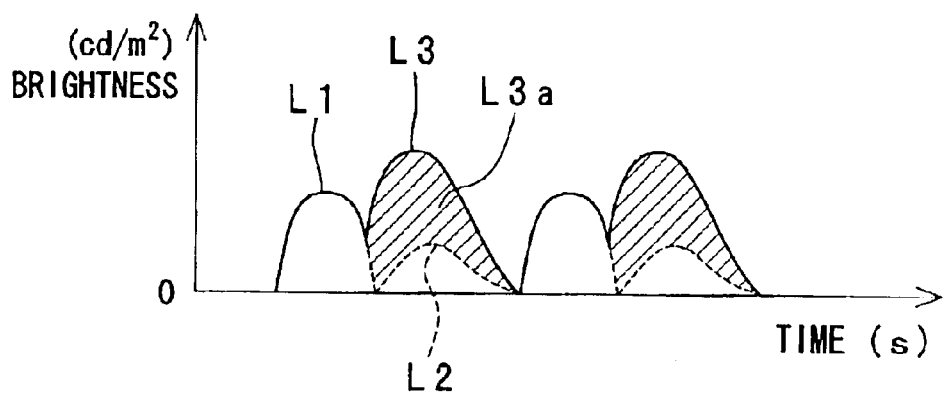
FIG. 4C is a view showing a waveform of a brightness of the discharge tube in the case of suitably controlling a duty ratio (on-duty) in the discharge lamp device of the present invention.

FIGS. 2A to 2C already shown are waveforms in a case where the on-duty is controlled to be 50%, while FIGS. 4A to 4C show waveforms when the on-duty is controlled to be 30%. FIG. 4A shows a waveform of the applied voltage, FIG. 4B shows a waveform of current and FIG. 4C shows a luminous brightness, respectively. It is understood from the figures that the brightness (represented by the brightness waveform L3) during the period for which the driving voltage is not applied is greater than the brightness (represented by the brightness waveform L1) during the period for which the positive voltage is applied, and therefore the luminous efficiency is further improved.

The driving circuit 5 is not limited to the one explained in the present embodiment. A circuit having another configuration may be used so long as the positive rectangular-wave voltage is applied to the internal electrode 1 while keeping the external electrode 2a at 0 V. Further, supplied power source may be a DC power source.

Figure 5A:
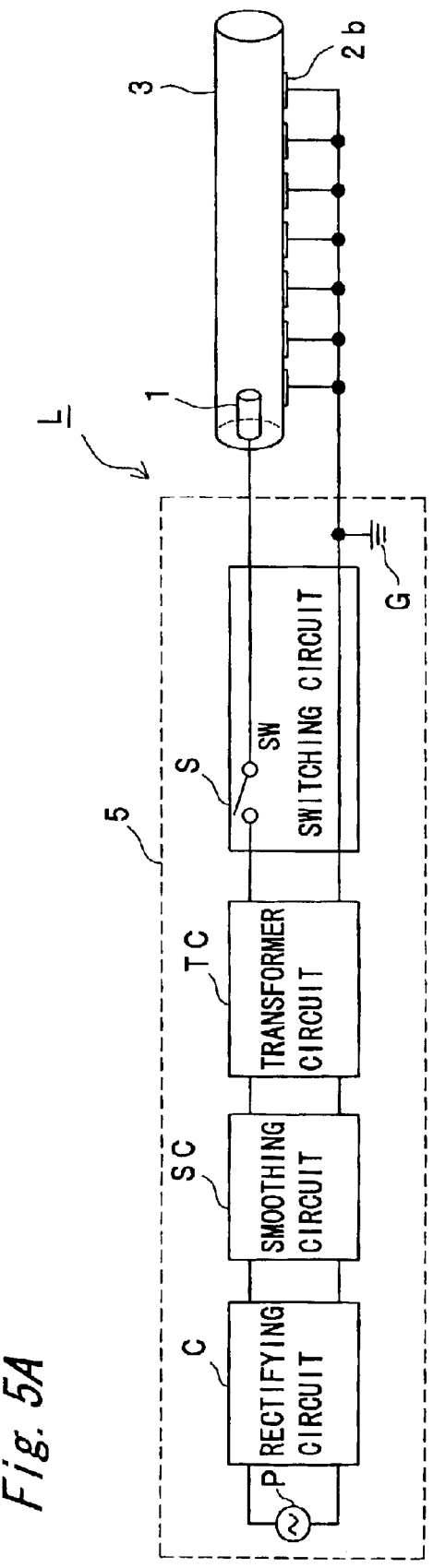
FIG. 5A is a block diagram showing another example of a configuration of the discharge lamp device in the first embodiment of the present invention.
Figure 5C:
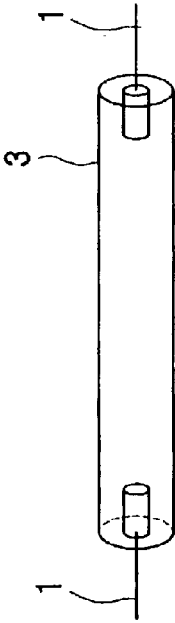
FIG. 5C is a view showing a discharge tube mounted with internal electrodes at both ends.
Figure 5B:
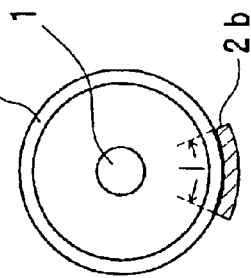
FIG. 5B is a sectional view of a discharge tube in FIG. 5A.

Moreover, the external electrode of the discharge tube 3 may be configured by a plurality of electrodes mounted along the axis direction of the discharge tube 3 and arranged spaced apart from each other with different distance from the internal electrode 1, as shown in FIG. 5A. In this case, the length (1) of the contact portion of the electrode 2b and the discharge tube 3 in the circumferential direction of the discharge tube 3 is preferably less than or equal to a half of the circumference of the discharge tube 3 in order to restrain the shield of light due to the external electrode (see FIG. 5B). It should be noted that the external electrode can be wound spirally along the tube axis direction of the discharge tube 3, in addition to the band shaped electrode or the electrode including a plurality of electrodes spaced apart from each other.

Although a single internal electrode 1 is mounted at one end of the discharge tube 3 in the above description, it is not limited thereto. The internal electrodes 1 may be mounted at both ends of the discharge tube 3 to apply a voltage to both ends (see FIG. 5C). In this case, the tube length of the discharge tube 3 is preferably not less than 200 m nor more than 600 mm in order to establish a discharge situation in the discharge tube same as that in the discharge tube having a single internal electrode 1.

Discharge is produced between the internal electrode 1 mounted at the end section of the discharge tube 3 and the external electrode 2a or 2b arranged all over the lengthwise direction of the discharge tube. Therefore, in a case where the discharge tube 3 has a small inner diameter and long length, the discharge is required to travel into the narrow path in the discharge tube 3 for a long period. Accordingly, there may be the case where ultraviolet ray is not emitted due to the self-absorption or the like of the discharge gas itself even if electric energy applied to the discharge lamp is adjusted. In a case where (entire length of the discharge tube)/(tube inner diameter of the discharge tube) >50, in particular, emission cannot uniformly be obtained all over the entire length of the discharge tube 3. In order to prevent this, a rare gas having higher ionization voltage is added to the actual discharge gas as a buffer gas for preventing the self-absorption of the discharge gas itself, to thereby be capable of obtaining a uniform emission all over the entire length of the discharge tube 3. Specifically, when Xenon gas is used as the discharge gas, Argon gas or Neon gas is preferably added as the buffer gas with the same amount of the discharge gas or a concentration less than that of the discharge gas. Accordingly, Xenon gas or Krypton gas is preferably used for the discharge gas, while Argon gas or Neon gas is preferably used as the buffer gas.

Further, when the pressure of the filler gas in the discharge tube 3 is low, the amount of the discharge gas in the discharge tube 3 is reduced, and thus necessary luminous energy can not be obtained even if electrical power is supplied thereto, and besides that, optical output can not be improved even if the on-duty ratio is varied since the distance between the molecules of the discharge gas is large. On the contrary, when the pressure of the filler gas is high, the discharge gas and the buffer gas become a barrier, and thus blocks the production of discharge all over the entire length of the discharge tube 3, thereby uniform emission cannot be obtained. Accordingly, the pressure of the filler gas ranges preferably from 1 kPa to 40 kPa in order to obtain an effect of the present invention.

Second Embodiment

Figure 6:
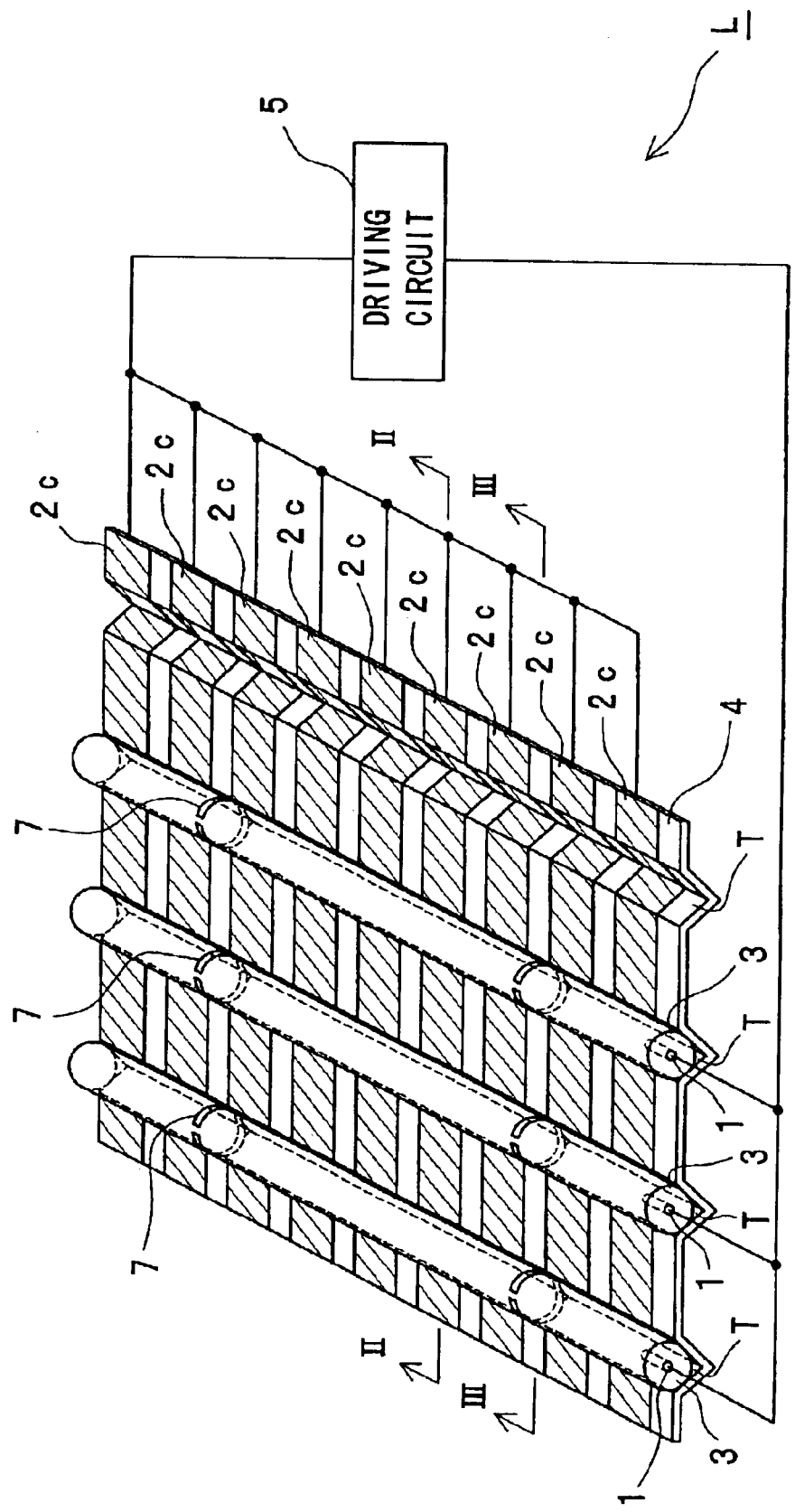
FIG. 6 is a view showing one example of a configuration of a discharge lamp device in a second embodiment of the present invention.
Figure 7:
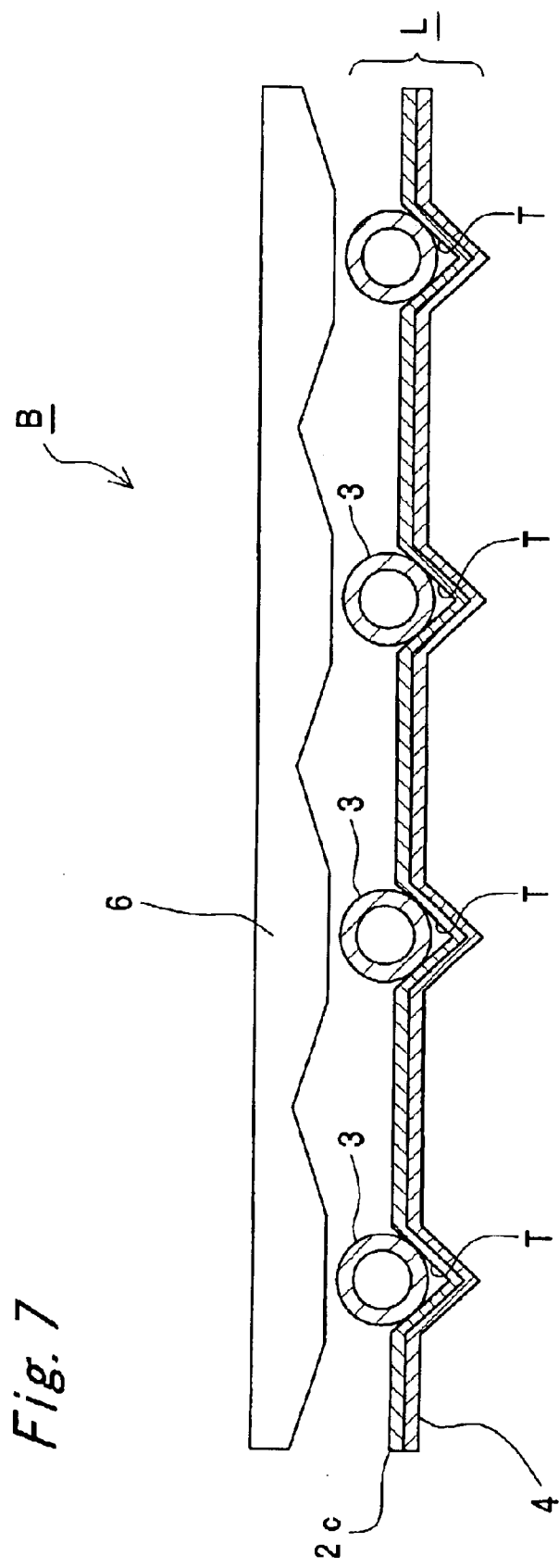
FIG. 7 is a sectional view taken along a line II—II of the discharge lamp device (backlight) in FIG. 6.
Figure 8:
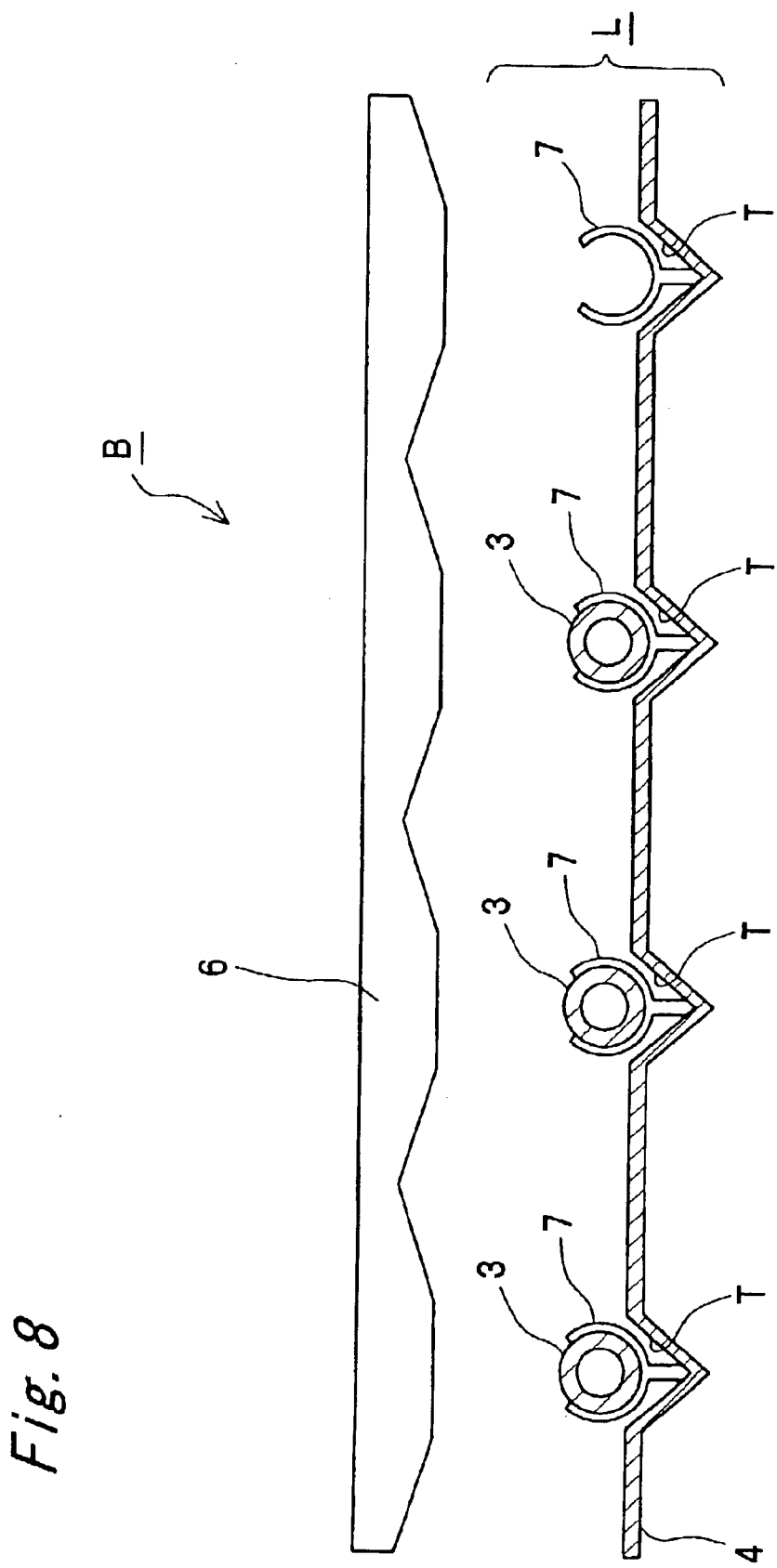
FIG. 8 is a sectional view taken along a line III—III of the discharge lamp device (backlight) in FIG. 6.

FIG. 6 is a view showing another configuration of an essential section of a discharge lamp device according to the present invention. FIG. 7 is a sectional view taken along a line II—II in FIG. 6, while FIG. 8 is a sectional view taken along a line III—III in FIG. 6. A discharge lamp device L in this embodiment is configured so as not to have an external electrode directly mounted at the outer peripheral surface of the discharge tube 3, but to have a plurality of external electrodes 2c arranged parallel to each other on a support plate 4 facing the discharge tube 3. These parallel-arranged external electrodes 2c are rendered to have a fixed reference potential as shown in the first embodiment. Japanese Patent Application No. 2001-285415 filed by the present applicant discloses a discharge lamp device configured such that a plurality of external electrodes 2c are arranged in parallel on the support plate 4 and the discharge tube 3 is arranged to have its tube axis direction perpendicular to the extending direction of the external electrodes 2c. It is unnecessary to mount the external electrode directly on the outer peripheral surface of the discharge tube by parallel-arranging a plurality of external electrodes on the support plate on which the discharge tube is placed as described above. Accordingly, a discharge lamp device simply manufactured and low in cost can be realized compared to the case where the electrode is directly fixed onto the outer peripheral surface of the discharge tube.

The discharge tube 3 shown in FIG. 6 are filled with a rare gas, and the internal electrodes 1 are made of nickel or the like mounted and are at one end thereof. The support plate 4 for placing the discharge tubes 3 thereon is formed by processing a resinous material or a metal material such as an aluminum or the like. The surface of the support plate 4 is subject to, for example, a coating with a silk printing, or a surface treatment (such as satin finished surface treatment) by a sand blasting or the like for enhancing reflection efficiency and diffusion efficiency of light. It should be noted that the support plate 4 may have light transmittance characteristic other than reflection characteristic. Which support plate is used can suitably be selected according to need.

The support plate 4 has a plurality of channels T for housing the discharge tubes 3. The external electrodes 2 are formed by a silver paste or the like in the direction perpendicular to the longitudinal direction of the housing channels T (i.e., in the direction perpendicular to the axis direction of the discharge tube 3). The external electrode 2 may be molded of a conductive resinous material instead of the silver paste, and be integrated by pressure with the support plate 4 which is similarly made of a resinous material. Further, the shape of the housing channel T is suitably set according to the shape of the discharge tube 3.

As shown in FIGS. 6 and 8, a plurality of support members 7 for supporting the discharge tube 3 are mounted in the housing channel T of the support plate 4. Each of the support members 7 is made of aluminum or the like, and the lower end thereof is fixed to the housing channel T of the support plate 4, and the upper end thereof detachably holds the discharge tube 3. The discharge tube 3 is held by the support members 7 and engaged to be placed on the housing channel T of the support plate 4 such that a portion of the parallel-arranged external electrode 2c at the housing channel T is brought into contact with the outer peripheral surface of the discharge tube 3 as shown in FIG. 7.

The internal electrode 1 of the discharge tube 3 is connected to the driving circuit 5 explained in the first embodiment, so that the driving voltage explained in the first embodiment is applied between the internal electrode 1 of the discharge tube 3 and the external electrode 2c. Specifically, the potential of the external electrode 2c is fixed to a reference potential (voltage of 0 V) and a rectangular-wave voltage having only a positive voltage is applied to the internal electrode 1. The discharge lamp device L having the above-mentioned configuration produces a glow discharge in the discharge tube 3 to thereby bring the inactive gas filled therein into an excitation state, and the phosphor in a phosphor layer 3a is excited by ultraviolet ray emitted upon bringing the rare gas from the excitation state to a normal state, thereby emitting visible light.

Moreover, a flat light guide plate 6 is arranged above the discharge lamp device L such that the principal plane of the light guide plate 6 is opposed to the principal plane of the support plate 4. Specifically, the flat light guide plate 6 is provided a the position opposite to the support plate 4 via the discharge tube 3. This constitutes a backlight B of a liquid crystal display device or the like. The visible light produced in the discharge tube 3 is incident on the flat light guide plate 6 to be diffused. The light guide plate 6 is made of a resin or the like and has a function of converting light produced from the discharge tube 3 into a uniform plane light source. Such a backlight B is especially effective for an application to a backlight for a liquid crystal display device from the viewpoint of its small size, thin size and low power consumption.

Third Embodiment

Figure 9:
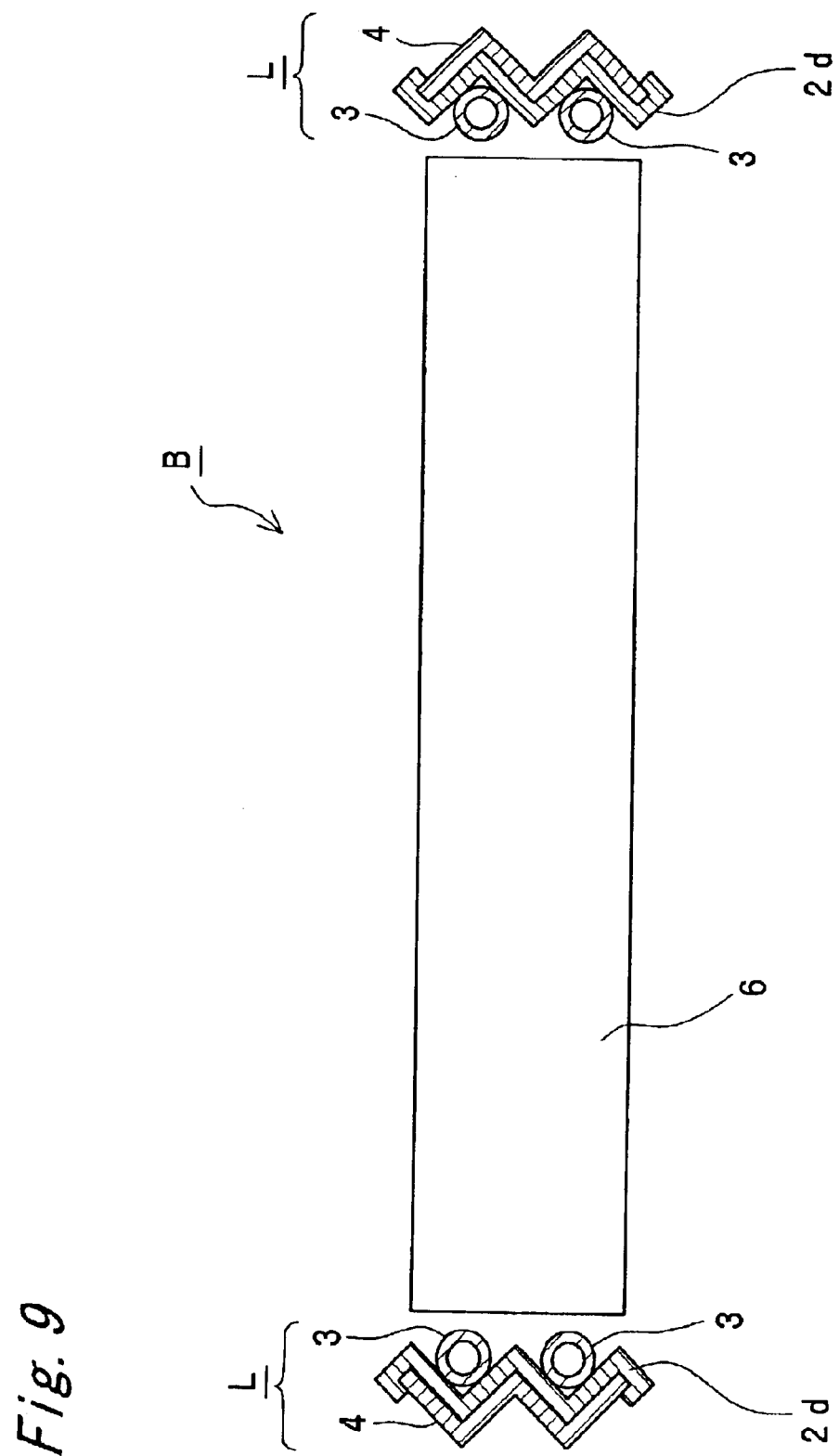
FIG. 9 is a view showing one example of a configuration of main part of a discharge lamp device in the third embodiment of the present invention.

FIG. 9 is a view showing a another configuration of an essential section of a discharge lamp device according to the present invention. Although the second embodiment discloses a direct-below-type backlight in which the discharge lamp device L is disposed on the principal plane side of the light guide plate 6 as shown in FIGS. 7 and 8, this embodiment discloses an edge-light-type backlight in which the discharge lamp device L is disposed on the side of the edge of the light guide plate 6. The backlight in the present embodiment is basically almost the same as that in the second embodiment except that the discharge tube 3 is arranged facing the edge surface of the light guide plate 6, so that a detailed explanation is omitted here. It should be noted that the driving circuit is omitted in FIG. 9.

Fourth Embodiment

As described in the first embodiment, the brightness can be increased by suitably controlling the on-duty of the rectangular-wave voltage having only the positive voltage applied to the internal electrode. The control of the on-duty will be explained in detail in this embodiment.

Figure 10:
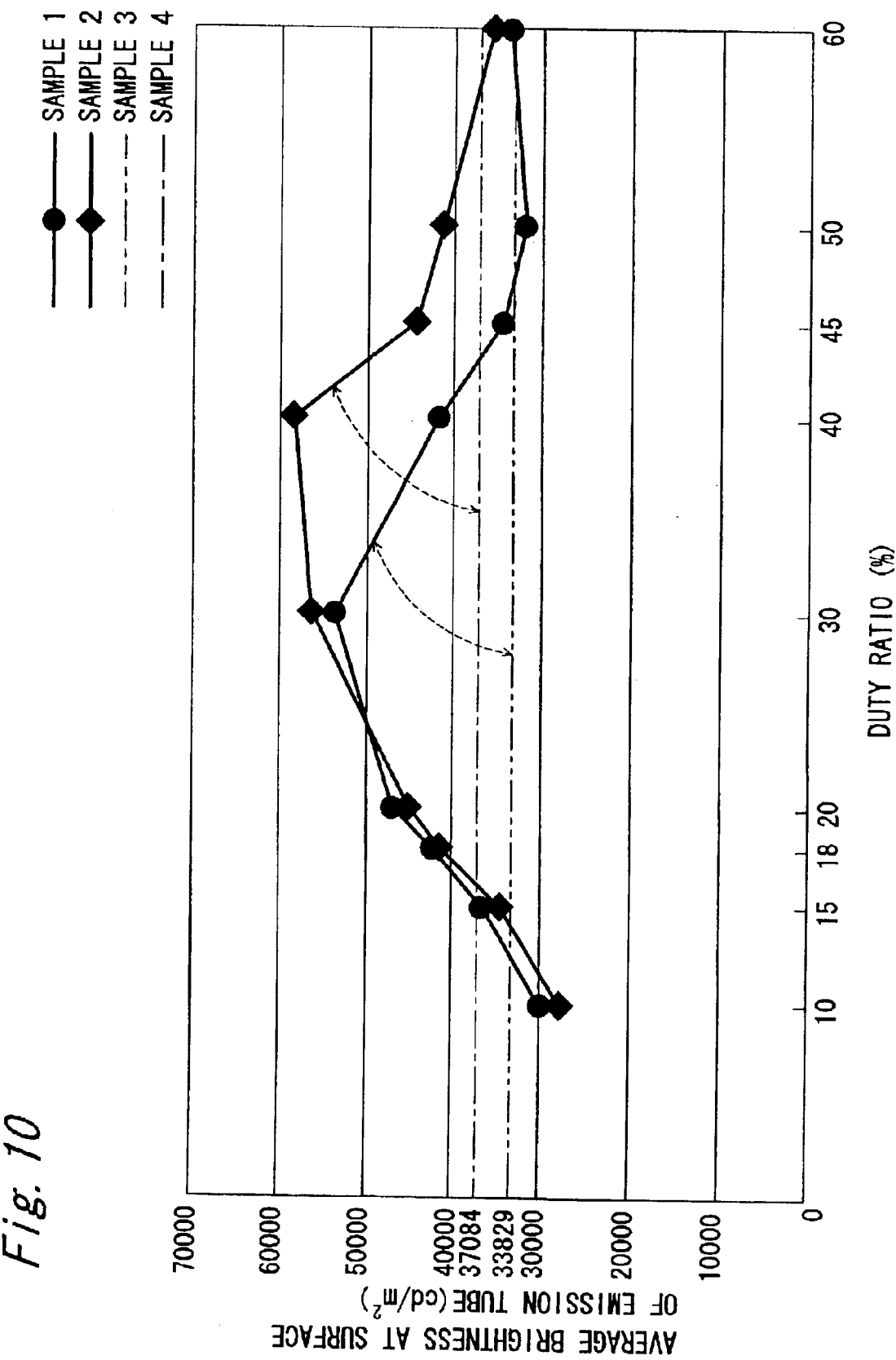
FIG. 10 is a characteristic view showing a change in a brightness when the duty ratio (on-duty) is varied in the fourth embodiment.

FIG. 10 is a characteristic view showing the change in the brightness in-the case of varying the on-duty (T1/T2). The axis of ordinate represents the on-duty (%) of the rectangular wave having only the positive voltage applied to the internal electrode 1, while the axis of abscissa represents the average brightness ($cd/m^2$) at the surface of the discharge tube 3. The used discharge tube 3 has an outer diameter of 2.6 mm, inner diameter of 2.0 mm, tube thickness of 0.3 mm and tube length of 164 mm. Regarding the filling condition of the rare gas, Xe and Kr serving as discharge media were filled so as to have a ratio of 6 (Xe) to 4 (Kr), and the internal pressure was 22.2 kPa. The frequency of the applied rectangular wave was 40.0 kHz, and the voltage was 2.0 kV (the present embodiment: 0 kV to +2 kV, conventional: −1 kV to +1 kV). The internal electrode 1 was only provided at one end of the discharge tube 3. Further, green color phosphor was used. The present embodiment used $LaPO_4$:Ce, Tb as a green phosphor.

Samples 1 to 4 were prepared under the above-mentioned conditions.

The sample 1 is the discharge lamp device L described in the first embodiment shown in FIG. 1, wherein the single band-shaped external electrode 2 having a width of 2 mm is fixed along the tube axis direction at the outer peripheral surface of the discharge tube 3. A rectangular-wave voltage having only a positive voltage with respect to the external electrode 2 was applied between the internal electrode 1 and the external electrode 2 of the sample 1 from the driving circuit 5, varying the on-duty from 10% to 60%.

Figure 14:
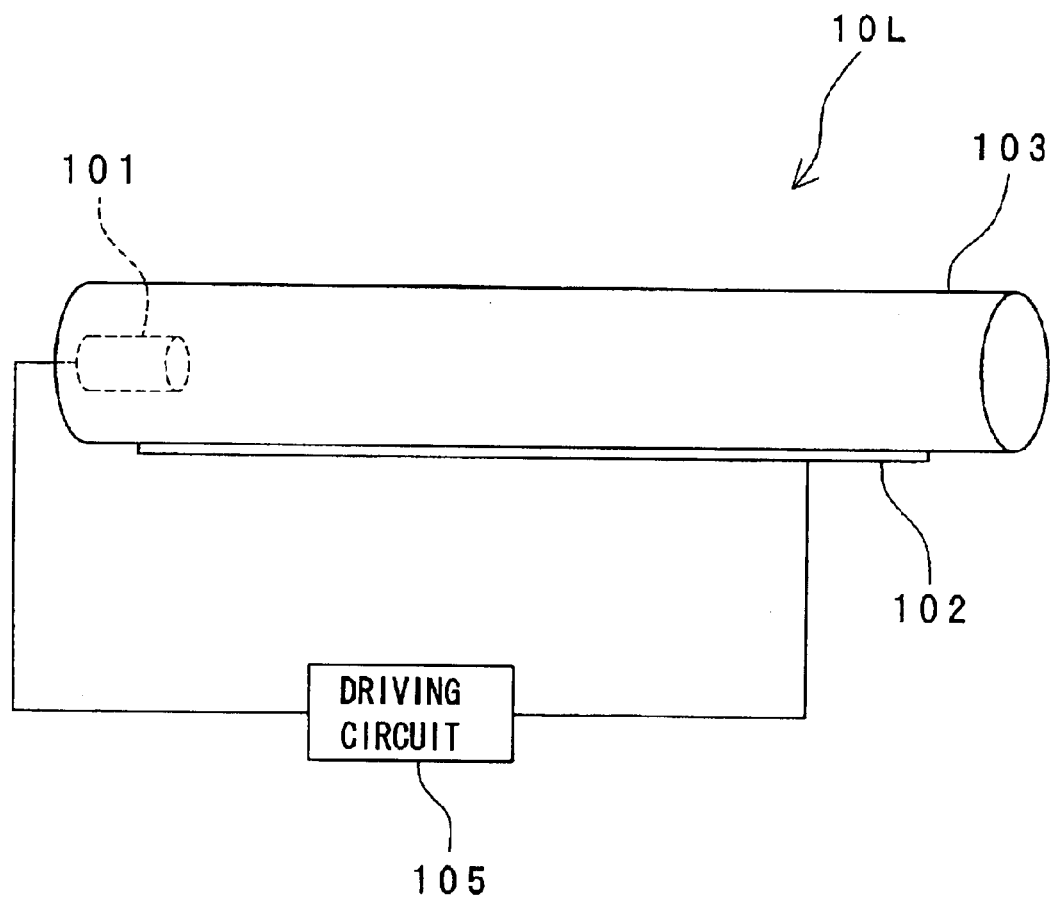
FIG. 14 is a view typically showing a conventional discharge lamp device.
Figure 15A:
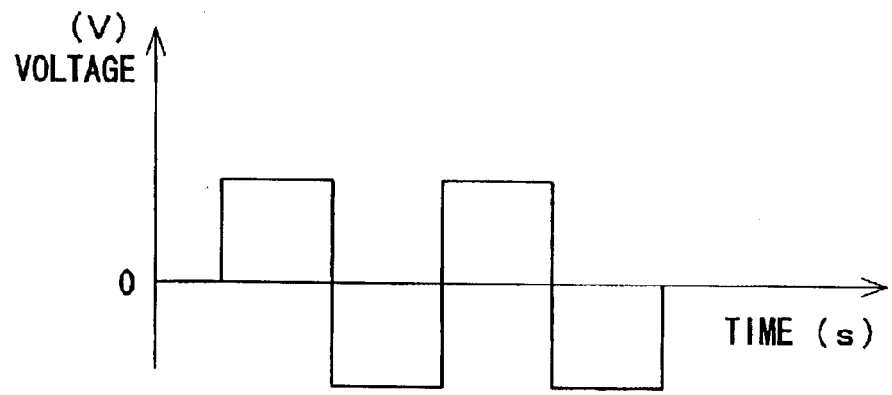
FIG. 15A is a view showing a waveform of an applied voltage in the conventional discharge lamp device.
Figure 15B:
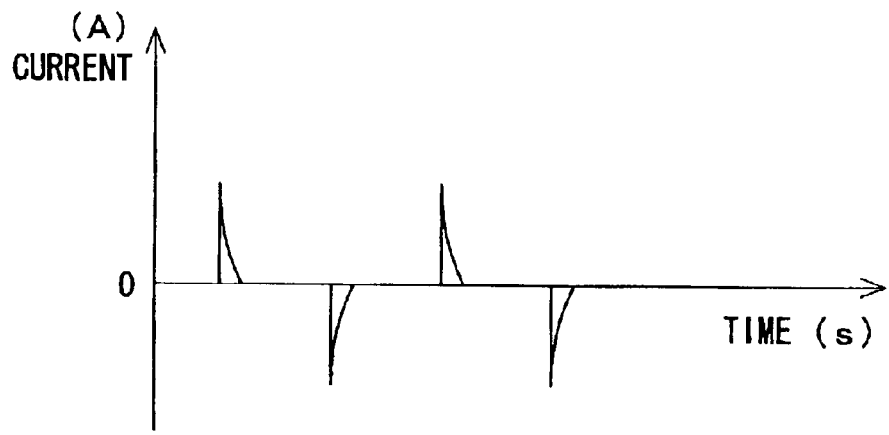
FIG. 15B is a view showing a waveform of current in the conventional discharge lamp device.
Figure 15C:
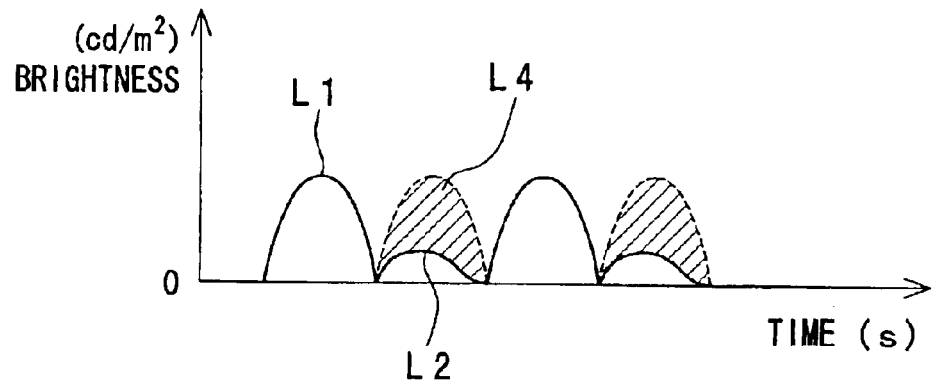
FIG. 15C is a view showing a waveform of a brightness of a discharge tube in the conventional discharge lamp device.

The sample 3 has the same configuration as the sample 1, but an alternating voltage (duty of 50%) with the reference potential provided by the external electrode 2 was applied between the internal electrode 1 and the external electrode 2. This is the same as the conventional discharge lamp device 10L (see FIGS. 14 and 15).

The sample 2 is the discharge lamp device L described in the second embodiment shown in FIG. 6, in which the external electrode 2 formed on the support plate 4 had the width of 3 mm and the interval of each external electrode 2c was 1 mm. A rectangular-wave voltage having only a positive voltage was applied to the sample 2 from the driving circuit 5 with the on-duty varied from 10% to 60%.

The sample 4 has the same configuration as the sample 2, but the applied voltage was an alternating voltage (duty of 50%).

In FIG. 10, bidirectional arrows shown by a broken line respectively represent a corresponding relationship between the sample 1 and the sample 3 as well as that between the sample 2 and sample 4. These arrows are aimed to clear the enhancement in the brightness characteristic (same in FIG. 11).

It is understood from FIG. 10 that the sample 1 provides higher brightness than the sample 3 to which the alternating voltage is applied within the on-duty range from 15% to 45%. The sample 2 provides higher brightness than the sample 4 to which the alternating voltage is applied within the on-duty range from 15% to 50%. Specifically, the brightness characteristic can remarkably be improved in the discharge lamp device L of the first to third embodiments compared to the conventional discharge lamp device to which the alternating voltage is applied, by suitably controlling such that the on-duty is placed within the above-mentioned range. The increase in the brightness due to the control of the on-duty as described above is considered that the excimer emission that is an emission at the wavelength area having high luminous efficiency of the phosphor increases with the variation of the on-duty (see FIGS. 3A and 3B).

Moreover, comparing the sample 1 with sample 2 in FIG. 10, higher brightness can be obtained by the sample 2 in spite of applying the rectangular-wave voltage having only a positive voltage to both samples. The brightness is clearly different in particular within the on-duty range of 30% to 50%. For example, the brightness at the on-duty of 45% is about 34 k ($cd/m^2$) in the sample 1, while it is about 44 k (cd/m2) in the sample 2, realizing a remarkable enhancement in the brightness by 30% or more.

Specifically, in the case of using the conventional band shaped external electrode, the brightness is improved by applying the rectangular-wave voltage having only a positive voltage, compared to the conventional case of applying the alternating voltage. The brightness is further remarkably improved by the configuration in which a plurality of external electrodes are arranged spaced apart from each other in the tube axis direction. It is understood that the effect obtained by the sample 2 can also be obtained by the discharge tube 3 shown in FIG. 5A. The reason why the brightness of the sample 2 becomes higher than that of the sample 1 in the case of controlling the on-duty within the range of 30% to 50% is considered that the contraction discharge is likely to occur in the sample 1 due to the influence of the shape of the electrode, thereby exerting an action for reducing the brightness.

Figure 11:
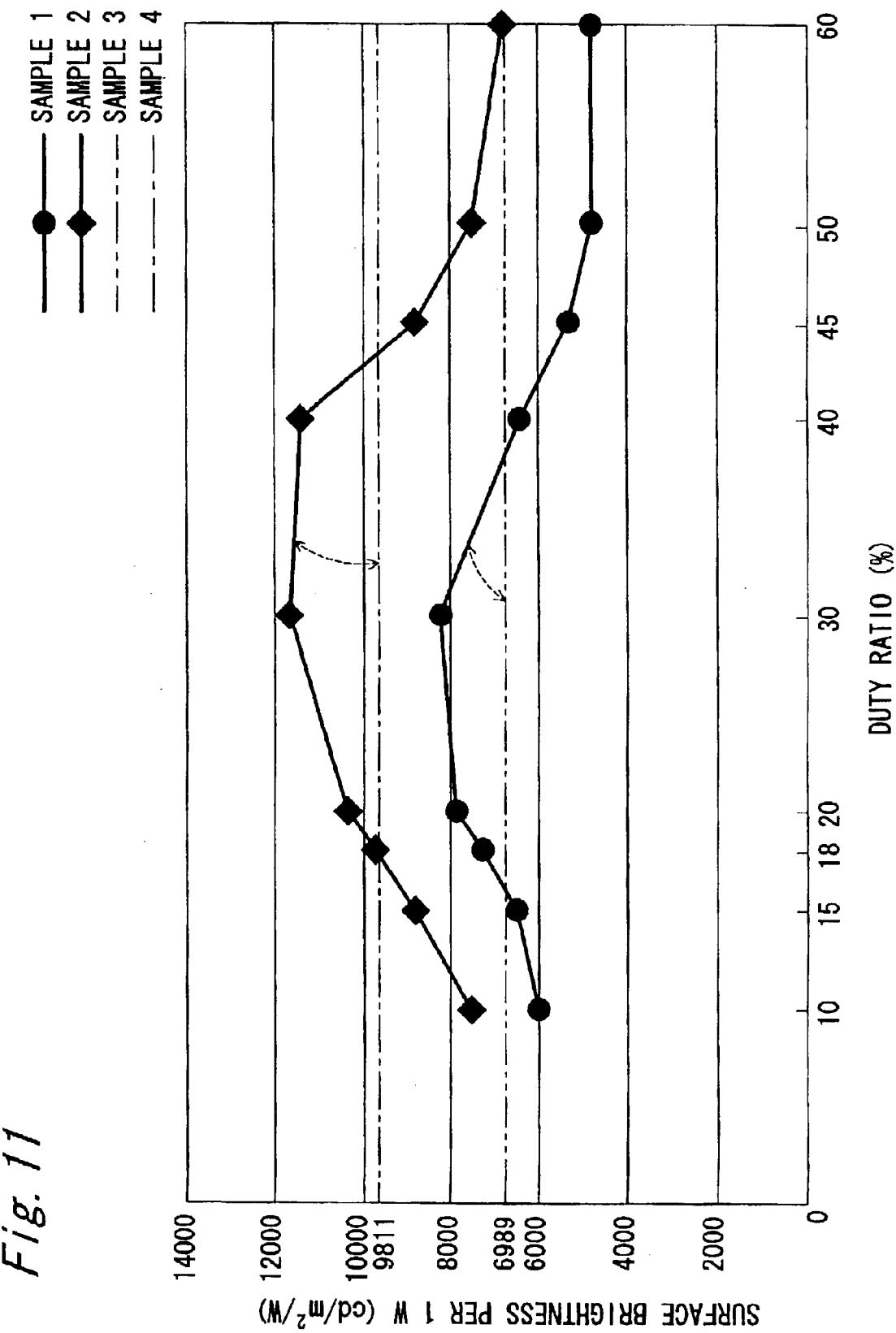
FIG. 11 is a characteristic view showing a change in a brightness per 1 watt when the on-duty is varied in the fourth embodiment.

FIG. 11 is a characteristic view showing a brightness change per 1 W when the on-duty is varied as described above. The axis of ordinate represents the on-duty (%), while the axis of abscissa represents a surface brightness per 1 W ($cd/m^2/W$), i.e., luminous efficiency. The samples 1 to 4 have the same conditions as described above.

Comparing the sample 1 and sample 3, the surface brightness per 1 W of the sample 1 is higher within the on-duty range of a little more than 15% to a little less than 40%. Comparing the sample 2 and sample 4, the surface brightness per 1 W of the sample 2 is higher within the on-duty range of 18% to a little more than 40%. Specifically, the luminous efficiency can be improved with respect to the conventional discharge lamp device by controlling the on-duty within these ranges.

As is apparent from the characteristic views of FIGS. 10 and 11, controlling the on-duty within the range of 18% to a little more than 40% can realize the improvement in the brightness as well as the improvement in the luminous efficiency, thereby being capable of obtaining a high brightness characteristic and luminous efficiency that cannot be obtained by the conventional discharge lamp device.

Subsequently considered is the case where the rectangular-wave voltage having only a negative voltage is applied between the external electrode and the internal electrode, for which a new sample 5 was prepared for comparison. The sample 5 is the discharge lamp device L having the configuration described in the second embodiment shown in FIG. 6, to which the rectangular-wave voltage having only the negative voltage is applied by inverting the polarity of the applied voltage from the driving circuit 5. Specifically, the rectangular-wave voltage having only the negative voltage is applied to the internal electrode 1 with the external electrode 2c defined as the reference voltage (0 V) in the sample 5, and the on-duty is suitably changed to measure the brightness and luminous efficiency.

Figure 12:
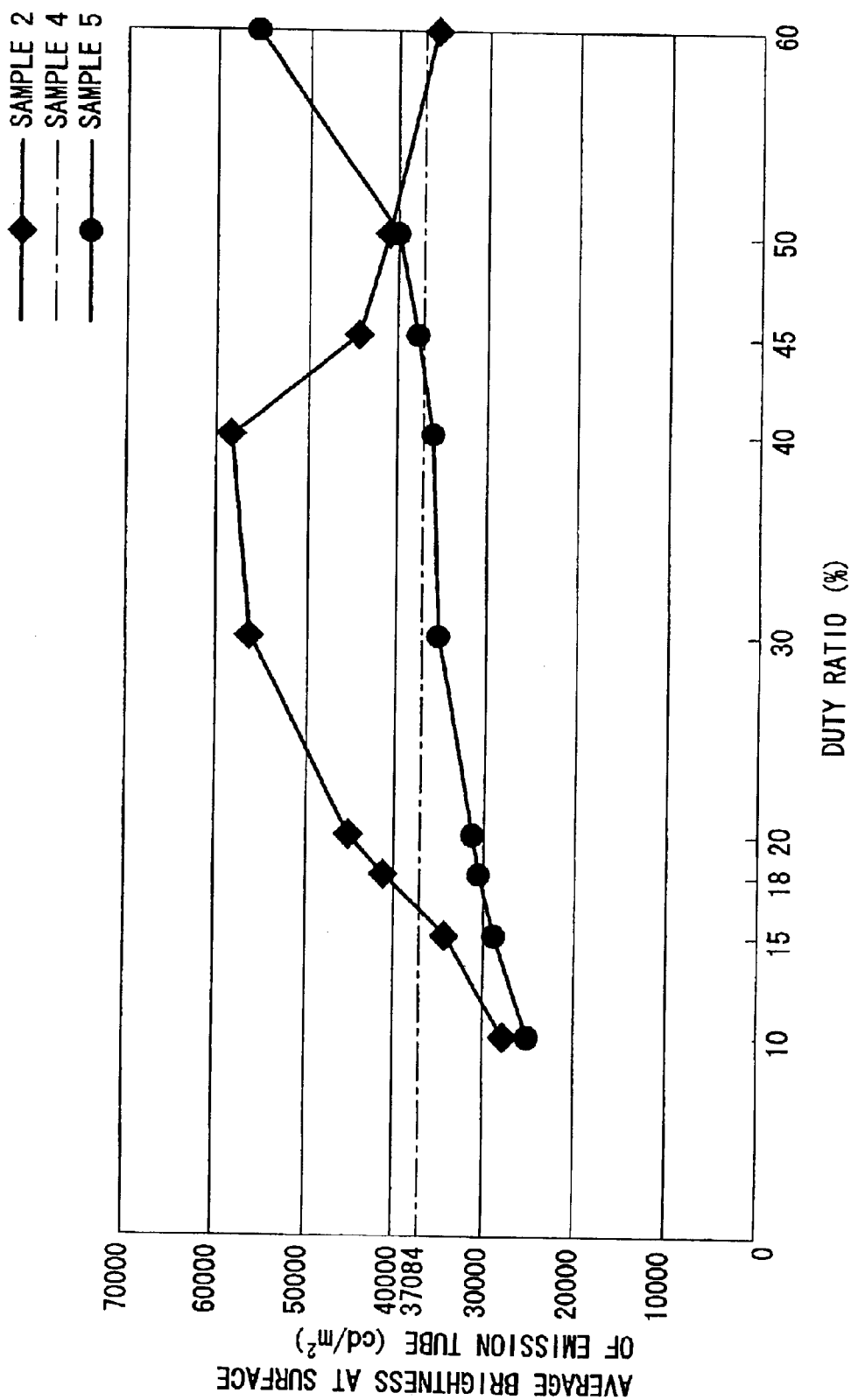
FIG. 12 is a characteristic view for comparing a change in brightness between the case where a positive rectangular-wave voltage is applied and the case where a negative rectangular-wave voltage is applied in the fourth embodiment.
Figure 13:
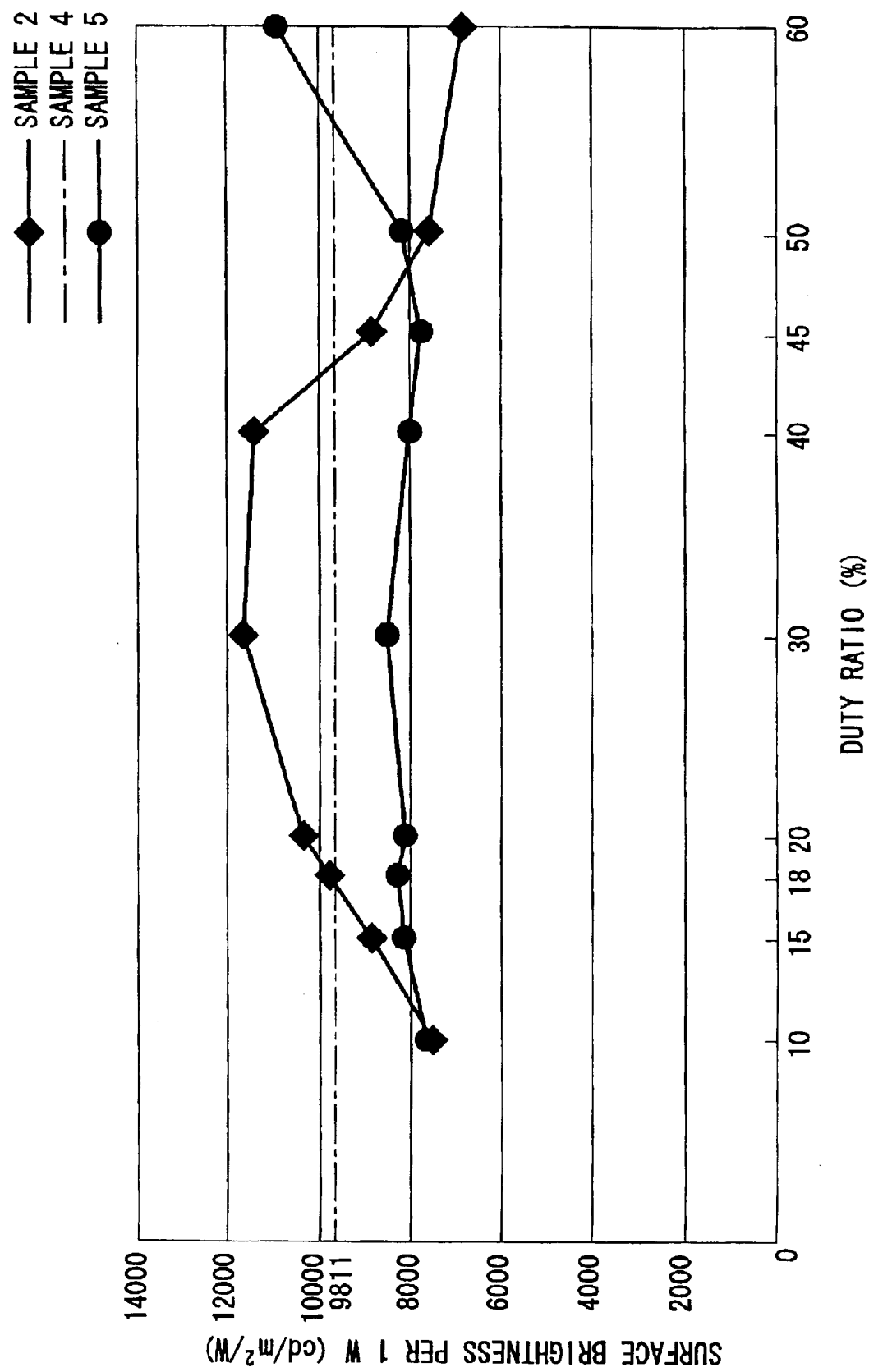
FIG. 13 is a characteristic view showing a change in brightness per 1 W between the case where a positive rectangular-wave voltage is applied and the case where a negative rectangular-wave voltage is applied in the fourth embodiment.

FIG. 12 is a characteristic view for comparing the difference between the case where the rectangular-wave voltage having only the positive voltage is applied and the case where the rectangular-wave voltage having only the negative voltage is applied between the external electrode and the internal electrode. The axis of abscissa represents the on-duty (%), while the axis of ordinate represents the average brightness (cd/m$^2$) at the surface of the discharge tube 3, respectively. FIG. 13 is a characteristic view showing a change in the brightness per 1 W in this case. The axis of abscissa represents the on-duty (%), while the axis of ordinate represents the surface brightness (cd/m$^2$/W) per 1 W, respectively. As to the sample 5, the period when the rectangular-wave voltage having only the negative voltage is applied is defined as T1 while the cycle is defined as T2 for determining the on-duty (%). Characteristics were measured with respect to the samples 2, 4 and 5.

Comparing the sample 2 and the sample 5 in FIG. 12, the brightness characteristic of the sample 2 to which the rectangular-wave voltage having only the positive voltage is more excellent than that of the sample 5 to which the rectangular-wave voltage having only the negative voltage within the on-duty range of 10% to 50%. Specifically, applying the rectangular-wave voltage having only the positive voltage has the effect of improving the brightness compared to the case where the rectangular-wave voltage having only the negative voltage is applied.

Comparing the sample 2 and the sample 5 in FIG. 13, the luminous efficiency of the sample 2 to which the rectangular-wave voltage having only the positive voltage is more excellent than that of the sample 5 to which the rectangular-wave voltage having only the negative voltage within the on-duty range of 10% to a little less than 50%. Specifically, applying the rectangular-wave voltage having only the positive voltage has the effect of improving the luminous efficiency compared to the case where the rectangular-wave voltage having only the negative voltage is applied.

As described above, applying the rectangular-wave voltage having only the positive voltage has a greater effect on improving the brightness and the luminous efficiency than applying the rectangular-wave voltage having only the negative voltage.

Although this embodiment shows a result of evaluation with a single green color, the phosphor used for the discharge tube is not limited to LaPO$_4$:Ce, Tb. It is possible to suitably select and use not only a phosphor for a three band fluorescent lamp or for a plasma display such as BaMgAl$_x$O$_y$:Eu (x and y are optionally selected) for a blue phosphor, LaPO$_4$:Ce, Tb, Zn$_2$SiO$_4$:Mn, BaMg$_2$Al$_{14}$O$_{24}$:Eu, Mn for a green phosphor, and Y$_2$O$_3$:Eu, (Y, Gd)BO$_3$:Eu, YPVO$_4$:Eu, YVO$_4$:Eu as a red phosphor, but also a generally used phosphor such as a halophosphate phosphor emitting a white color. Increasing the excimer emission ratio of the discharge gas generally enhances the quantum efficiency of the phosphor, thereby being capable of increasing the optical output.

According to the present invention, in a backlight and a backlight for a liquid crystal display device, a second electrode as an external electrode is rendered to provide a reference potential (applied voltage is 0 V) and a rectangular-wave voltage having only a positive voltage is applied to a first electrode as an internal electrode. Thus, sufficient brightness can be obtained even if current at a falling edge flows upon the falling of the positive voltage, and further a luminous efficiency can be enhanced.

Further, the present invention has a support plate for the discharge tube on which a plurality of second electrodes are arranged in parallel, thereby the formation of the external electrode is facilitated. Accordingly, the present invention can reduce manufacturing costs and simplify the discharge tube in addition to enhancing the brightness characteristic and luminous efficiency.

Although the present invention has been described in connection with specified embodiments thereof, many other modifications, corrections and applications wille be apparent to those skilled in the art. Therefore, the present invention is not limited by the disclosure provided herein but limited only to the scope of the appended claims.

The present disclosure relates to subject matter contained in Japanese patent application No. 2002-159081, filed on May 31, 2002, which is expressly incorporated herein by reference in its entirety.

What is claimed is:

1. A discharge lamp device, comprising:
   a discharge tube filled with a rare gas and having a first electrode mounted inside of the discharge tube, and a second electrode mounted on the outside of the discharge tube;
   a driving circuit for applying a voltage between the first and second electrodes,
   wherein the driving circuit applies a positive rectangular wave voltage to the first electrode with a potential of the second electrode being a reference potential.

2. The discharge lamp device according to claim 1, wherein the second electrode comprises a plurality of electrodes arranged spaced apart from each other in a tube axis direction of the discharge tube.

3. The discharge lamp device according to claim 1, wherein the rare gas comprises one of Xenon gas and Krypton gas.

4. The discharge lamp device according to claim 1, wherein the rectangular-wave voltage has a duty ratio of not less than 15% nor more than 50%.

5. The discharge lamp device according to claim 4, wherein the frequency of the rectangular-wave voltage is not less than 10 kHz nor more than 60 kHz.

6. The discharge lamp device according to claim 4, wherein the first electrode is mounted at one end of the discharge tube and a length of the discharge tube is not less than 100 mm nor more than 300 mm.

7. The discharge lamp device according to claim 4, wherein the first electrode comprises a pair of internal electrodes mounted at both ends of the discharge tube, respectively, and a length of the discharge tube is not less than 200 mm nor more than 600 mm.

8. The discharge lamp device according to claim 4, wherein the discharge tube is cylindrical and has an inner diameter of not less than 1 mm nor more than 10 mm and a thickness of not less than 0.2 mm nor more than 0.5 mm.

9. A backlight having at least one discharge tube and a discharge lamp device according to claim 1.

10. The backlight according to claim 9, further comprising a light guide plate to be arranged on a back plane of a liquid crystal display device, wherein the discharge tube is arranged so as to face the light guide plate.

11. The discharge lamp device according to claim 1, wherein the first electrode is placed at the end of the discharge tube.

12. A discharge lamp device, which drives a discharge tube filled with a rare gas and has a first electrode mounted at the inside thereof, comprising:

a support plate having a plurality of second electrodes arranged in parallel and supporting the discharge tube in proximity to the discharge tube; and a driving circuit that applies a voltage between the first and second electrodes, wherein the driving circuit applies a positive rectangular-wave voltage to the first electrode with a potential of the second electrode being a reference potential.

13. The discharge lamp device according to claim 12, wherein the rectangular-wave voltage has a duty ratio of not less than 15% nor more than 50%.

14. The discharge lamp device according to claim 13, wherein the first electrode comprises a pair of internal electrodes mounted at both ends of the discharge tube, respectively, and a length of the discharge tube is not less than 200 mm nor more than 600 mm.

15. The discharge lamp device according to claim 13, wherein the discharge tube is cylindrical and has an inner diameter of not less than 1 mm nor more than 10 mm and a thickness of not less than 0.2 mm nor more than 0.5 mm.

16. The discharge lamp device according to claim 13, wherein the frequency of the rectangular-wave voltage is not less than 10 kHz nor more than 60 kHz.

17. The discharge lamp device according to claim 13, wherein the first electrode is mounted at one end of the discharge tube and a length of the discharge tube is not less than 100 mm nor more than 300 mm.

18. A backlight having at least one discharge tube and a discharge lamp device according to claim 12.

19. The backlight according to claim 18, further comprising a light guide plate to be arranged on a back plane of a liquid crystal display device, wherein the discharge tube is arranged so as to face the light guide plate.

20. The discharge lamp device according to claim 12, wherein the rare gas comprises one of Xenon gas and Krypton gas.

* * * * *